United States Patent
Gaben (10) Patent No.: US 8,404,375 B2
(45) Date of Patent: Mar. 26, 2013

(54) ELECTRICAL BATTERY COMPRISING FLEXIBLE GENERATING ELEMENTS AND A SYSTEM FOR THE MECHANICAL AND THERMAL CONDITIONING OF SAID ELEMENTS

(75) Inventor: Fabien Gaben, Courbevoie (FR)

(73) Assignee: Dow Kokam France SAS, Massy (FR)

( * ) Notice: Subject to any disclaimer, the term of this patent is extended or adjusted under 35 U.S.C. 154(b) by 314 days.

(21) Appl. No.: 12/420,162

(22) Filed: Apr. 8, 2009

(65) Prior Publication Data
US 2009/0253026 A1 Oct. 8, 2009

(30) Foreign Application Priority Data

Apr. 8, 2008 (FR) .................................... 08 01937

(51) Int. Cl.
*H01M 2/12* (2006.01)
*H01M 2/14* (2006.01)
*H01M 2/18* (2006.01)
*H01M 6/42* (2006.01)
*H01M 6/46* (2006.01)
*H01M 6/50* (2006.01)

(52) U.S. Cl. .............. 429/120; 429/53; 429/56; 429/72; 429/149; 429/156; 429/247

(58) Field of Classification Search .................. None
See application file for complete search history.

(56) References Cited

U.S. PATENT DOCUMENTS

| | | | |
|---|---|---|---|
| 3,246,689 A | 4/1966 | Remde et al. | |
| 3,816,181 A | 6/1974 | Buckethal | |
| 3,870,563 A * | 3/1975 | Ruben | 429/228 |
| 4,107,402 A | 8/1978 | Dougherty et al. | |
| 4,678,725 A | 7/1987 | Kikuchi et al. | |
| 5,212,025 A | 5/1993 | Shibata et al. | |
| 5,268,242 A * | 12/1993 | Morandi | 429/99 |
| 5,278,002 A | 1/1994 | Hiers | |
| 5,283,137 A | 2/1994 | Ching | |
| 5,378,552 A * | 1/1995 | Dixon, Jr. | 429/91 |
| 5,510,203 A | 4/1996 | Hamada et al. | |
| 5,510,207 A | 4/1996 | Grivel et al. | |
| 5,558,960 A | 9/1996 | Mitchell | |

(Continued)

FOREIGN PATENT DOCUMENTS

| | | |
|---|---|---|
| DE | 19849491 C1 | 1/2000 |
| DE | 102007010742 A1 | 8/2008 |

(Continued)

*Primary Examiner* — Melvin C Mayes
*Assistant Examiner* — Colin W Slifka
(74) *Attorney, Agent, or Firm* — Harness, Dickey & Pierce, P.L.C.

(57) ABSTRACT

An electrical battery includes a plurality of electrical energy generating elements formed by at least one electrochemical cell that is packaged in a flexible sealed envelope, and a system for the mechanical and thermal conditioning of the elements. The conditioning system forms a structural body made from thermally conductive material. The body has two longitudinal members and a plurality of cross-members connecting the longitudinal members so as to form between the cross-members housings in which respectively a generating element is disposed. The body includes a circulation path for a thermal conditioning fluid. The path has two channels, respectively upstream and downstream, that are formed respectively in a longitudinal member and passages formed in each of the cross-members. The passages are in fluid communication on each side with respectively the upstream channel and the downstream channel.

35 Claims, 8 Drawing Sheets

U.S. PATENT DOCUMENTS

| | | | |
|---|---|---|---|
| 5,674,640 A | 10/1997 | Mrotek et al. | |
| 5,756,227 A | 5/1998 | Suzuki et al. | |
| 5,800,945 A | 9/1998 | Grivel et al. | |
| 5,885,732 A | 3/1999 | Verhoog | |
| 5,985,483 A | 11/1999 | Verhoog et al. | |
| 6,013,374 A * | 1/2000 | Watanabe et al. | 428/424.8 |
| 6,033,800 A | 3/2000 | Ichiyanagi et al. | |
| 6,042,961 A | 3/2000 | Verhoog et al. | |
| 6,444,353 B1 | 9/2002 | Takaki et al. | |
| 6,482,542 B1 | 11/2002 | Takaki et al. | |
| 6,569,561 B1 | 5/2003 | Kimura et al. | |
| 6,864,013 B2 | 3/2005 | Gow et al. | |
| 2002/0028375 A1 | 3/2002 | Morishita et al. | |
| 2003/0077516 A1* | 4/2003 | Macklin et al. | 429/254 |
| 2003/0232236 A1 | 12/2003 | Mitchell et al. | |
| 2004/0069620 A1 | 4/2004 | Bitsche et al. | |
| 2005/0170240 A1 | 8/2005 | German et al. | |
| 2005/0170241 A1 | 8/2005 | German et al. | |
| 2006/0127735 A1* | 6/2006 | Sabin et al. | 429/35 |
| 2009/0020620 A1 | 1/2009 | Douarre | |
| 2009/0220850 A1* | 9/2009 | Bitsche et al. | 429/50 |
| 2010/0119926 A1 | 5/2010 | Gaben et al. | |
| 2010/0119929 A1 | 5/2010 | Gaben et al. | |

FOREIGN PATENT DOCUMENTS

| | | |
|---|---|---|
| EP | 0522981 A1 | 1/1993 |
| EP | 0881696 A1 | 12/1998 |
| EP | 1397841 A2 | 3/2004 |
| FR | 2694136 A1 | 1/1994 |
| FR | 2742002 A1 | 6/1997 |
| FR | 2867613 A1 | 9/2005 |
| FR | 2870387 A1 | 11/2005 |
| FR | 2895838 A1 | 7/2007 |
| WO | WO-9402969 A1 | 2/1994 |
| WO | WO-0011730 A1 | 3/2000 |
| WO | 0227816 A1 | 4/2002 |
| WO | WO-2006093010 A1 | 9/2006 |
| WO | 2006108529 A1 | 10/2006 |

* cited by examiner

ELECTRICAL BATTERY COMPRISING FLEXIBLE GENERATING ELEMENTS AND A SYSTEM FOR THE MECHANICAL AND THERMAL CONDITIONING OF SAID ELEMENTS

BACKGROUND (1) Field of the Invention

The invention concerns an electrical battery that is in particular intended for electrical or hybrid motor vehicle traction, that is to say comprising an electric motor driving the driven wheels combined with a thermal engine driving these wheels or possibly other driven wheels.

(2) Prior Art

In particular, the invention applies to a high degree of hybridisation of thermal vehicles which may go as far as complete electrification of the traction chain. In this case, the batteries do not then merely serve to assist the vehicles in the acceleration phases but also to provide movement of the vehicle autonomously over greater or lesser distances.

To guarantee the levels of power and energy required for the applications in question, it is necessary to create batteries comprising a plurality of electrical energy generating elements.

However, when these elements are charged and discharged, the result is a production of heat which, when it is not controlled, may have the effect of reducing the service life of the elements, or even giving rise, under extreme conditions, to risks of thermal runaway for certain chemical components of elements, leading to deterioration of the battery.

Thus, in order to optimize the performance and service life of the batteries, thermal conditioning systems for the elements are integrated in the batteries. In particular, the thermal conditioning systems may comprise a circulation path for a thermal conditioning liquid, said path being formed essentially around the generating elements.

In addition, in the automobile application envisaged, the efficacy of the systems must be high since the thermal dissipation peaks depend on the current densities and their variations, which may reach very high values, in particular during phases of high acceleration, regenerative breaking, rapid discharges of the battery or motorway functioning in electrical mode.

The generating elements conventionally comprise at least one electrochemical cell, for example of the lithium-ion or lithium-polymer type, which is formed by a stack of electroactive layers acting successively as cathodes and anodes, said layers being put in contact by means of an electrolyte.

These electrochemical cells are generally packaged in rigid, hermetically sealed containers in order to protect them from external attacks. In particular, these containers may be manufactured from deep-drawn metal sheets in order to form cups which, after the introduction of a winding of stacked layers, can be closed by welding of a cover.

This type of packaging has certain drawbacks, including high manufacturing costs as well as the need to electrically insulate at least one of the electrodes of the metal cup and to add discharge valves for releasing the pressure in the event of overcharging or overheating of an element.

To resolve these drawbacks, it has been proposed to form a generating element by packaging a flat stack of electroactive layers in a sealed flexible envelope. In addition, this type of generating element typically has a prismatic geometry that increases the exchange surfaces with the thermal conditioning liquid.

However, with such an envelope, the mechanical strength of the elements is significantly weakened, which runs counter to the current constraints in the automotive industry, in particular relating to crashes.

In addition, the stack is then liable to deform, in particular with movements of the layers with respect to one another. In particular, such a deformation may be caused by the change in the volume of the active materials serving as anodes or cathodes according to its lithium-ion insertion rate.

The result of these movements is variations in the contact resistances between said layers, said variations producing additional heating that may lead to premature aging, a limitation to the energy available and risks of triggering of thermal runaway.

SUMMARY OF THE INVENTION

The invention aims to improve the prior art by proposing an electrical battery that combines the advantages of the use of generating elements with a flexible element with a mechanical and thermal packaging system that improves the service life and safety of the battery both from the point of view of electrochemical behaviour and vis-a-vis current constraints in the automotive industry, and particular those concerning crashes.

To this end, the invention proposes an electrical battery comprising a plurality of electrical energy generating elements formed from at least one electrochemical cell packaged in a flexible sealed envelope, said battery also comprising a system for mechanical and thermal packaging of said elements, said packaging system forming a structural body made from heat-conducting material, said body having two longitudinal members and a plurality of cross-members connecting said longitudinal members so as to form between said cross-members housings in which respectively a generating element is disposed, said body including a circulation path for a thermal conditioning fluid, said path comprising two channels respectively upstream and downstream formed respectively in a longitudinal member and passages formed in each of the cross-members, said passages being in fluid communication on each side with respect to the upstream channel and the downstream channel.

BRIEF DESCRIPTION OF THE DRAWINGS

Other particularities and advantages of the invention will emerge in the following description given with reference to the accompanying figures, in which:

FIG. 9 are representations of a generating element disposed in a housing according to an embodiment seen in front view (FIG. 9a) and seen in section AA (FIG. 9b), and according to a variant seen in section AA (FIG. 9c);

FIG. 14 are views in section of the alternating embedding of modules according to FIG. 13, the section being produced respectively at the generating elements (FIG. 14a) and at the upstream channel (FIG. 14b).

DETAILED DESCRIPTION OF THE PREFERRED EMBODIMENT(S)

Figure 1:
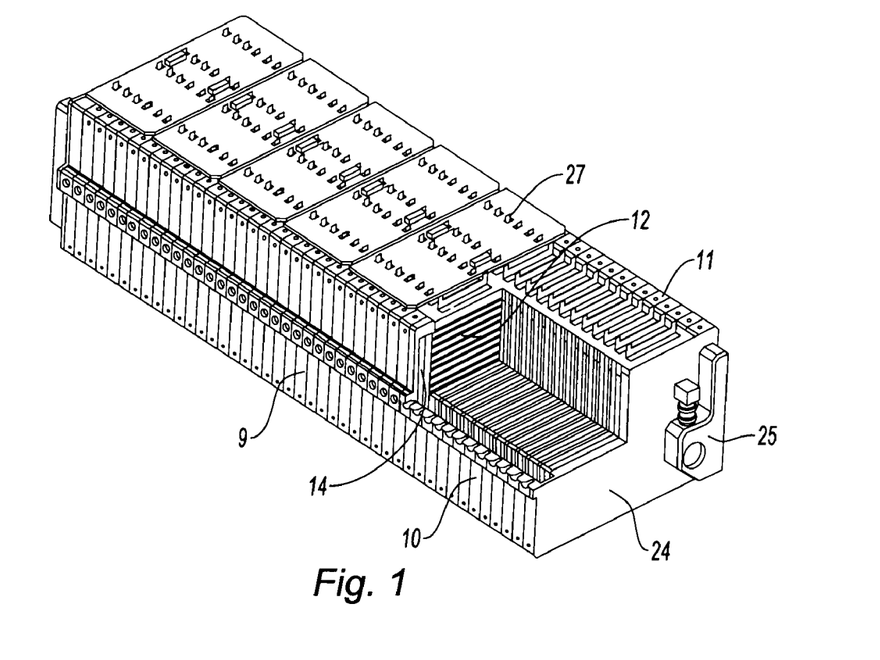
FIG. 1 is a partial view in partially cut-away perspective of a battery according to one embodiment of the invention, showing in particular the structural body of the mechanical and thermal packaging system as well as the arrangement of the generating elements therein.

In the description, the words positioning and space are taken with reference to the positioning of the battery shown in FIG. 1. However, the sealing of the battery makes it possible to envisage its positioning according to a different orientation.

In relation to the figures, an electrical battery is described below comprising a plurality of electrical energy generating elements 1 formed from at least one electrochemical cell 2 that is packaged in a flexible sealed envelope 3. In particular, the electrochemical cells 2 are of the lithium-ion or lithium-polymer type.

The battery is more particularly intended to supply a motor vehicle traction electric motor, whether it be a case of an electrical vehicle or of the electrical/thermal hybrid type. However, the battery according to the invention can also find its application for the storage of electrical energy in other transport modes, in particular in aeronautics. Moreover, in stationary applications such as for windmills, the battery according to the invention can also be used advantageously.

Figure 5:
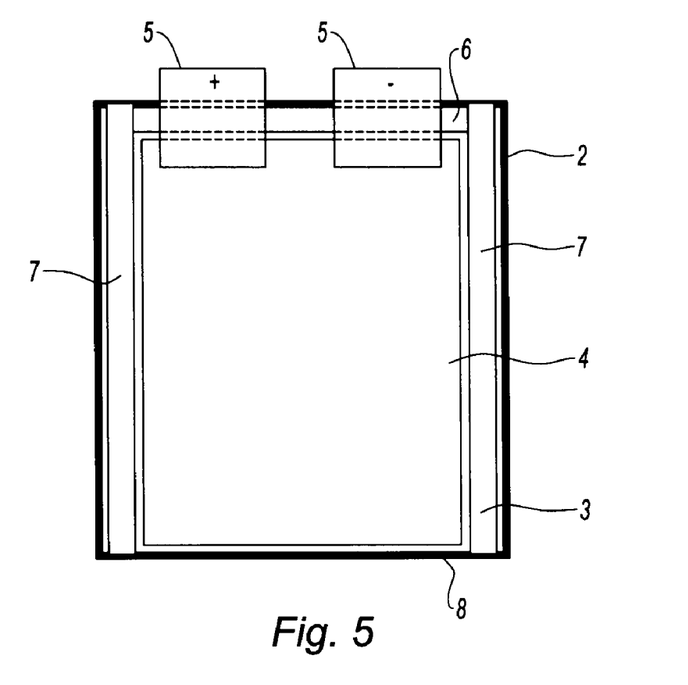
FIG. 5 is a view in longitudinal section of an electrochemical cell of the battery according to FIG. 1.

In relation to FIG. 5, an electrochemical cell 2 has a prismatic geometry and comprises a flat stack of electroactive layers 4 acting successfully as cathodes and anodes, said layers being put in contact by means of an electrolyte. Moreover, two terminals 5 extend beyond the top edge of the envelope 3 to allow electrical connection of said cell.

The envelope 3 comprises two sheets, the top 6 and lateral 7 edges of which are heat-welded to each other and the bottom edges 8 of which are folded in order to form the bottom of said envelope. In particular the sheets are formed with a multi-layer film disposed around the stack of electroactive layers 4, said sheets enclosing said stack, in particular producing the vacuum inside the envelope 3 prior to heat welding.

Moreover, the film is optimized in order to resist electrolyte and solvent attacks, the heat welding being arranged to resist attacks by air and moisture in order to ensure longevity for the electrochemical cell 2. This is because the chemistry of the lithium-ion or lithium-polymer cells is sensitive to water and air, which leads to premature oxidation resulting in an increase in internal resistances and pressure inside the envelope 3.

The battery comprises a system for the mechanical and thermal packaging of the generating elements, said system make it possible firstly to condition said elements for temperature and secondly to hold them in a reinforcing structure. Thus the system provides the electrical safety of the battery vis-a-vis risks relating to temperature, the functioning of the battery in an optimum temperature range and safety relating to risks of crashes, which are inherent in the application particularly considered.

To provide the mechanical packaging, the system forms a structural body 9 made from conductive material, in particular metal such as aluminium, which also has the advantage of a low weight. Structural means that the body 9 provides the mechanical strength of the generating elements 1, in particular relating to the current test crash constraints in the automotive industry but also in relation to other forms of mechanical stresses that the battery has to undergo in a car.

The body 9 has two longitudinal members 10, 11 that extend longitudinally while being disposed laterally at each side of the battery. The body 9 also has a plurality of cross-members 12 that extend transversely while connecting said longitudinal members so as to form between said cross-members housings 13 in which respectively a generating element 1 is disposed.

In addition, in order to provide the thermal conditioning, the envelope 3 includes a circulation path for a thermal conditioning fluid, said path comprising two channels, respectively upstream 14 and downstream 15, which are formed respectively in a longitudinal member 10, 11, and passages 16 formed in each of the cross-members 12, said passages being in fluid communication on each side with respectively the upstream channel 14 and the downstream channel 15. Thus the cross-members 12 form heat exchangers between the generating elements 1 and one of the same channels 14, 15 serves respectively for the supply and discharge of fluid for the passages 16 of all the cross-members 12.

In the embodiments depicted, the cross-members 12 are adjacent longitudinally so as to form the housings 13 between them, the upstream 14 and downstream 15 channels extending longitudinally in respectively a longitudinal member 10, 11. In addition, a single housing element 13 is formed between two adjacent cross-members 12.

In addition, the battery can comprise a fluidtight vessel 17, in particular made from plastic, in which the structural body 9 and the generating elements 1 are disposed, said vessel being arranged to allow its installation in the vehicle. In addition, a vacuum can be produced inside the vessel 17 in order to increase the thermal insulation and to increase the service life of the generating elements 1 by limiting the migration of air and moisture over said elements.

The battery also comprises a device (not shown) for circulating said fluid so as to provide the thermal conditioning of the elements 1, for example a pump that pressurises the fluid in a closed circuit, and also possibly a heat exchanger.

More precisely, the battery comprises means of supplying the upstream channel 14 with fluid and means of discharging fluid from the downstream channel 15 after said fluid has passed through the cross-members 12. In particular the passages 16 of each of the cross-members 12 can thus be supplied in parallel by a single upstream channel 14, so that the fluid running through each of the cross-members 12 issues directly from the upstream channel 14, without previously having to pass through another cross-member 12. The result is therefore excellent homogeneity while avoiding the accumulation of heat related to a succession of heat exchangers.

The fluid may be a gas, in particular air, or a liquid, in particular a dielectric liquid with a low vapour tension, or water, possibly glycolated. Thermal conditioning means both adding and withdrawing heat so as to maintain the generating elements 1 in a temperature operating range that is optimum. In particular, the conditioning system makes it possible to rapidly and effectively provide an addition or withdrawal of heat in the battery, so as to ensure thermal regulation whatever the conditions of use.

According to an embodiment shown in particular in FIGS. 6-7 and 12-14, the structural body 9 can be formed by the sealed association of modules 18. Thus it is possible to modulate the power of the battery in a particularly simple fashion by adjusting the number of modules 18 and therefore of generating elements 1.

To do this, the modules 18 shown comprise: two portions of longitudinal members 10, 11 in each of which a channel portion 14, 15 is formed; and a cross-member 12 on the edges of which respectively a longitudinal member portion 10, 11 is associated, the passages 16 of said cross-member being in fluid communication with said channel portions.

In addition, the association of the modules 18 is arranged so as to put the channel portions 14, 15 in fluid communication so as to form the upstream 14 and downstream 15 channels on each side of the passages 16.

Figure 11:
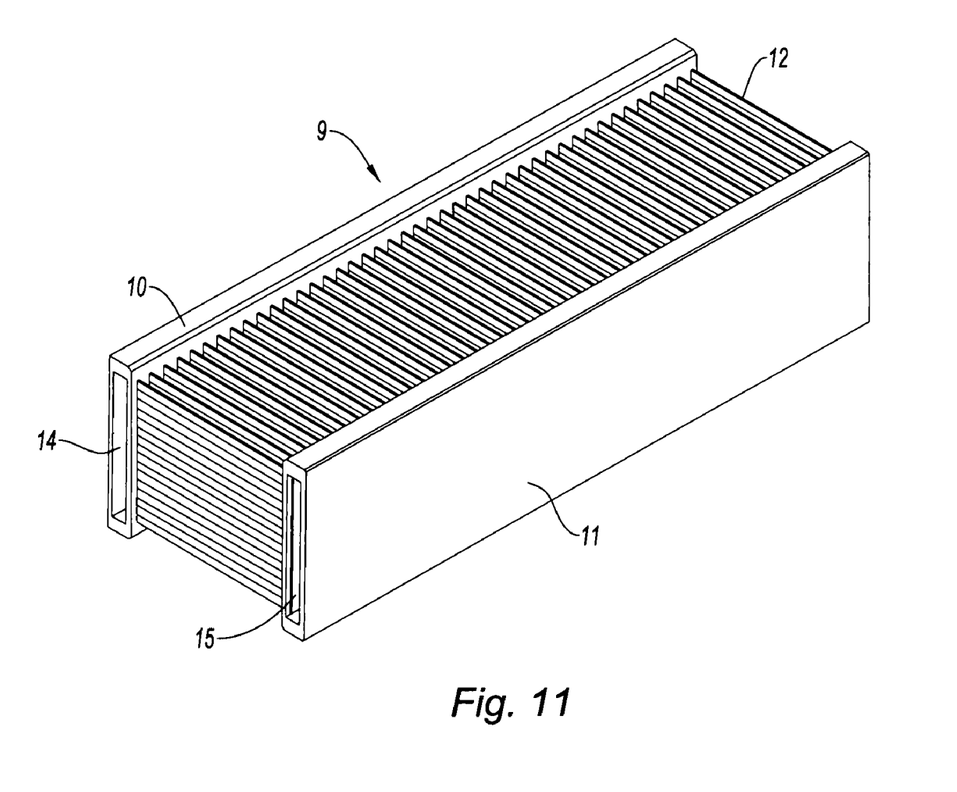
FIG. 11 is a view in perspective of a single-piece structural body for a battery according to one embodiment of the invention.

In a variant shown in FIG. 11, the structural body 9 can be in a single piece, for example forming a profiled welded structure forming the housings 13 in which the generating elements 1 are disposed. In particular, the arrangement of the longitudinal members and cross-members, and of the channels and fluid passages integrated therein, can be similar to the one described below in relation to a modular body. This single-piece structure has in particular the advantage of using profiled pieces that avoid expensive investment at each modification of the dimensions of the battery.

In FIGS. 6-7, 12-14, the cross-member 12 comprises a hollow plate 21 that is secured on each side to a frame 19 forming a portion of longitudinal members 10, 11, said frames being hollow in order to form a channel portion 14, 15 inside them. More precisely, each lateral edge of the plate 21 is inserted in a slot 20 passing through an edge of the frame 19, so as to put the inside of the plate 21 in communication with the inside of the frame 19. The hollow of the frames 19 has a rectangular section and the hollow of the plate 21 is provided with transverse ribs 22 forming between them channels forming passages 16 in which the fluid can circulate transversely from one frame 19 to the other.

In addition, the thickness of the frames 19 is greater than that of the plates 21 in order to form the housings 13 between two adjacent cross-members 12. In addition, the thickness of the hollow plate 21 is limited, for example around 0.5 mm, in order to promote heat exchanges with the generating elements 1 and contribute to the compactness of the battery.

Figure 6:
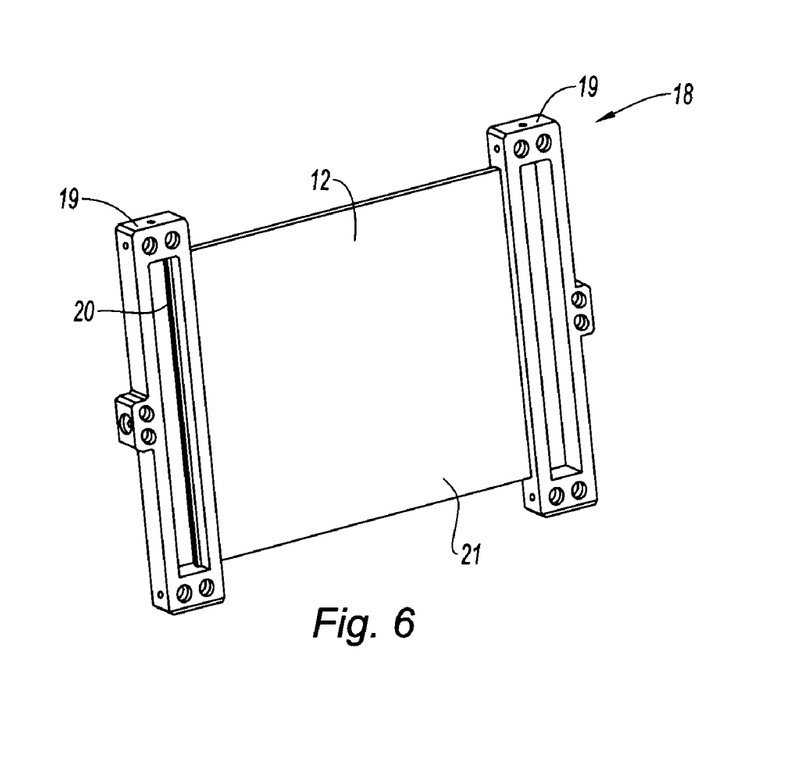
FIG. 6 is a perspective view of one of the modules forming the structural body of the battery according to FIG. 1.
Figure 7:
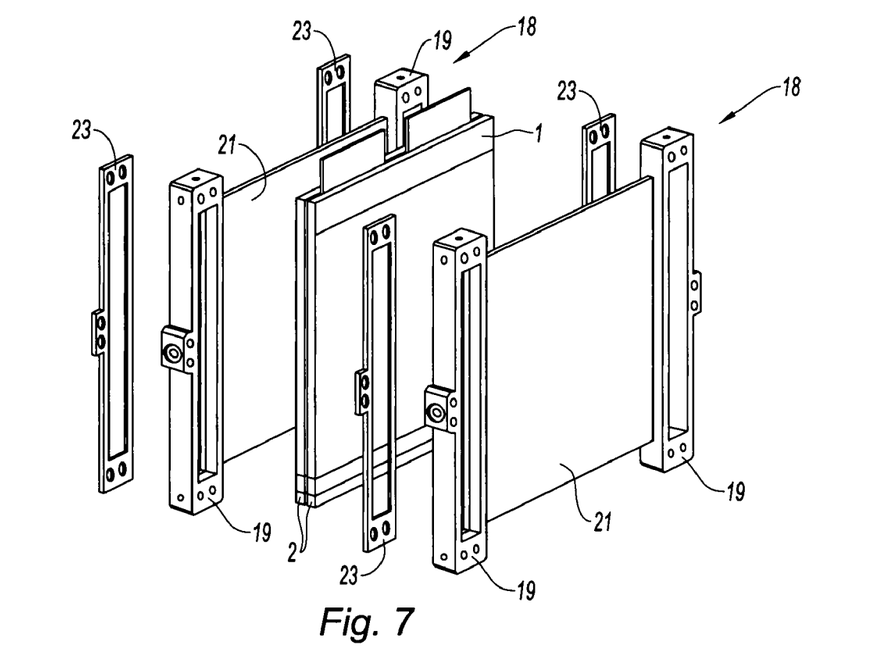
FIG. 7 is a view in exploded perspective showing the arrangement of a generating element between two modules according to FIG. 6.

FIG. 7 shows the design of the longitudinal stack of the modules 18 according to FIG. 6, putting the respective faces of the adjacent frames 19 in abutment on one another, so as to form a longitudinal channel 14, 15 on each side of the plates 21. In addition, the fluidtightness between the modules 19 is achieved by interposing a seal 23 between the faces of the frames 19.

Next the modules 18 are associated with one another, in particular forming means of association on the frame 19. In the embodiment shown in FIG. 7, the association is achieved by screwing through orifices provided on the frames 19. In addition, a plate 24 is associated at each end of the stack of modules 18 so as to close the channels 14, 15, said plates being provided respectively with fluid supply and recovery means 25.

In a variant that is not shown, the module can comprise a plate pressed so as to have a central part surrounded on each side by an opening, another plate being secured to the central part, forming fluid passages between said plates.

Figure 12:
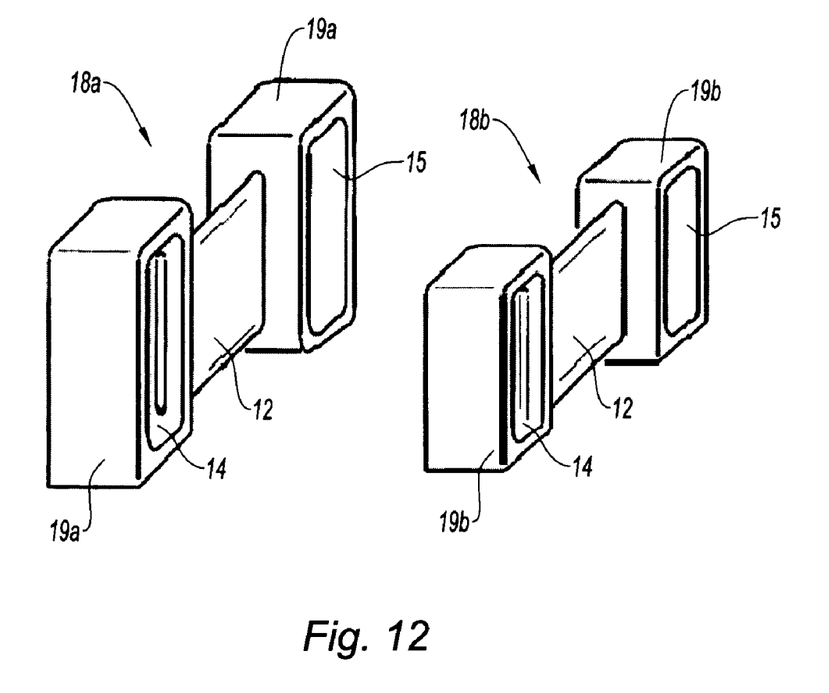
FIG. 12 is a view in perspective of two types of module for forming a structural body by alternating embedding.
Figure 13:
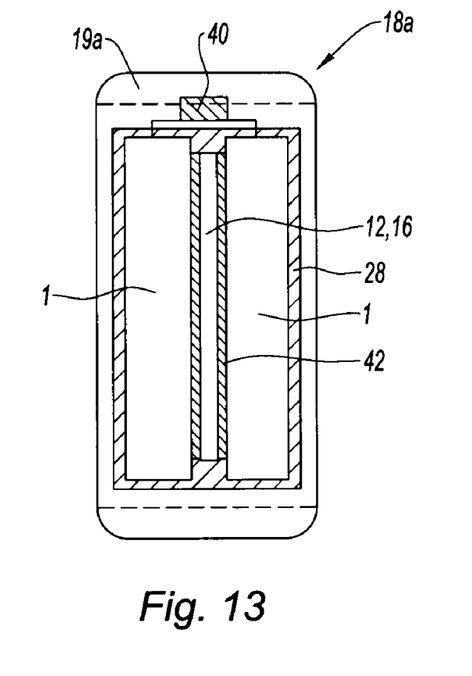
FIG. 13 is a view in section of a module according to FIG. 12, said module including a pair of generating elements and a structural matrix.
Figure 14A:
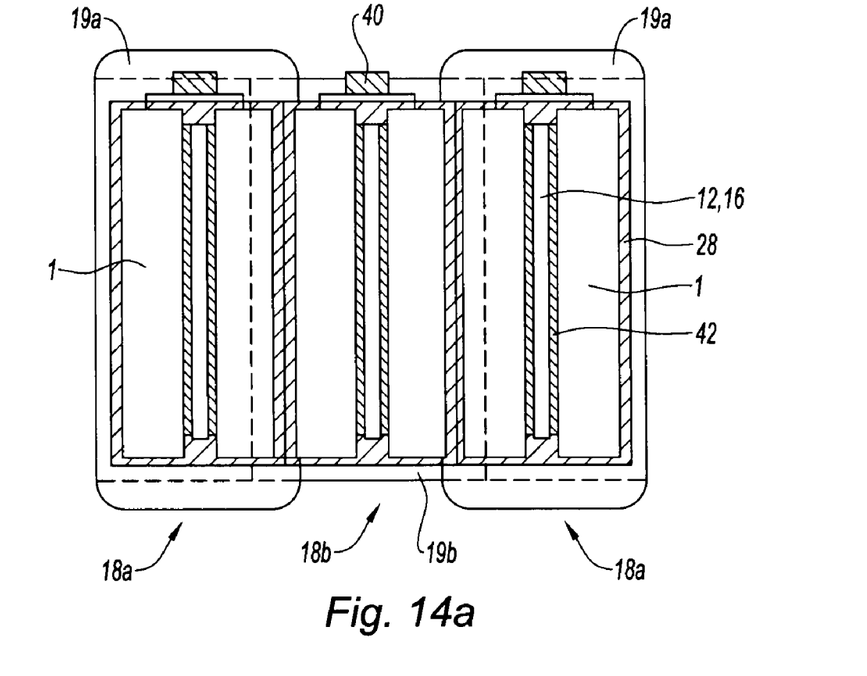
Figure 14B:
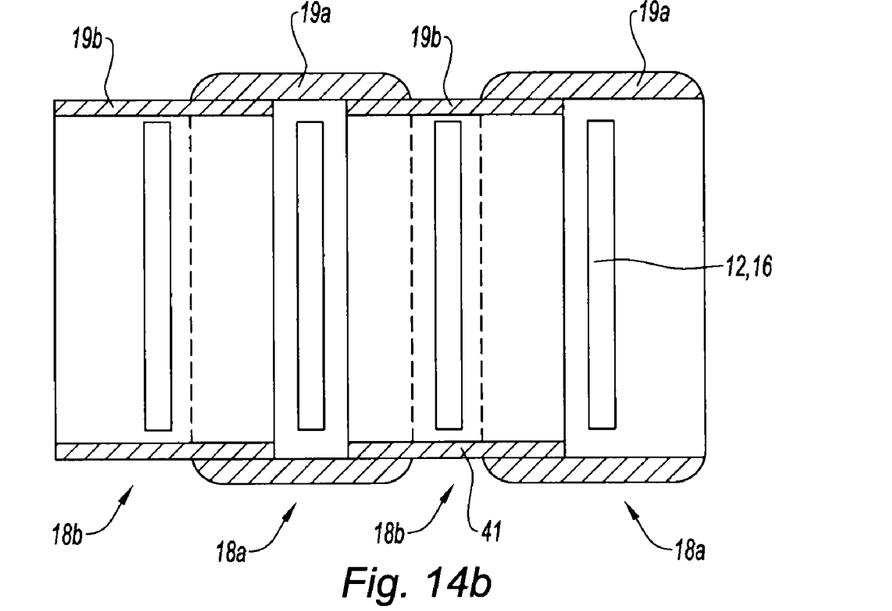

According to an embodiment in FIGS. 12-14, the modules 18 have male hollow frames 19a and female hollow frames 19b, the association of said modules being achieved by embedding said female hollow frames in said male hollow frames.

More precisely, the size of the hollow of the male frame 19a is equal to the external dimension of the female frame 19b, so as to allow the embedding of said female frame in said hollow, putting the channel portions 14, 15 in fluid communication.

In particular, it is thus possible to produce a body 9: having excellent rigidity propitious to resistance to automobile vibration stresses, without risk of having screws loosening over time; intrinsically fluidtight and not requiring the addition of any seal the resistance over time of which is known to be open to improvement and for which it is difficult to guarantee efficacy in terms of sealing during severe mechanical stresses; compact and lightweight without needing to add screws; the assembly time of which is greatly reduced.

To allow dismantling of the modules 18, a specific tool (for example of the wheel puller type) can be used to exert a sufficient traction force on the assembly to disconnect said modules. In addition, a plastic ring 41 can advantageously be added at the interface between the frames 19. This being removed, for example by cutting, after each dismantling, in order to be replaced with a new one that will guarantee once again the mechanical quality of the body after reassembly.

The embodiment shown provides a first type of module 18a having two male hollow frames 19a and a second type of module 18b having two female hollow frames 19b, the structural body 9 being formed by the alternate embedding of each of the types of module 18a, 18b (see FIG. 14).

In a variant not shown, each module 18 can have a male hollow frame 19a and a female hollow frame 19b, the structural body 9 being formed by the embedding of said modules in opposite orientations.

In the embodiment shown, the generating element 1 comprises two electrochemical cells 2 according to FIG. 5 that are fixed together, in particular by adhesively bonding one plate to the other, the respective terminals 5 being welded in parallel.

In addition, the generating elements 1 can be bonded to the cross-members 12, in particular by means of a thermal adhesive, so as to improve the mechanical holding of the generating elements 1 in the housings 13 while assisting heat transfers between said elements and said cross-members. In addition, the generating elements 1 can be arranged in the housings 13 so as to limit the movements of the electroactive layers 4 with respect to one another.

Figure 2:
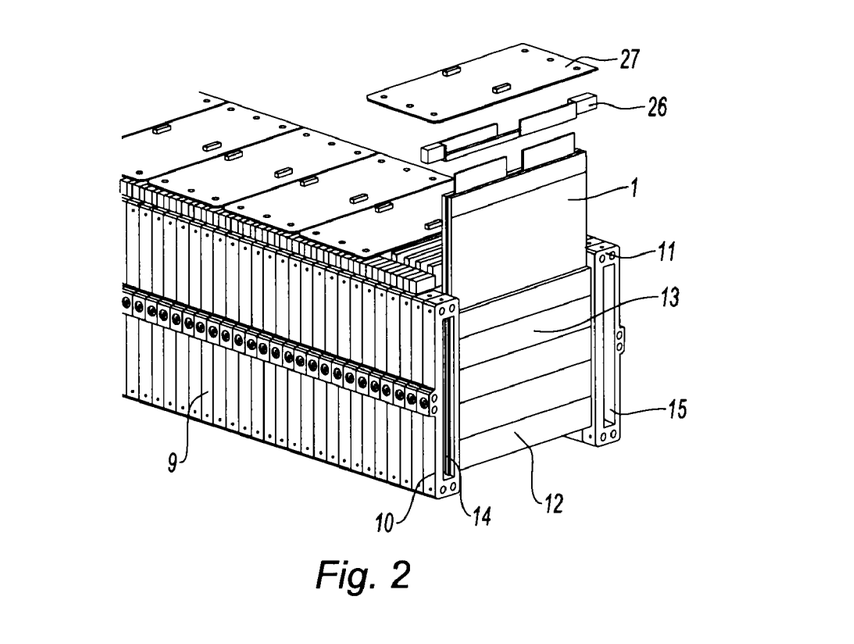
FIG. 2 is a partial view in perspective of the battery in FIG. 1, showing in exploded view a generating element as well as the associated bus bar and electronic card.
Figure 3:
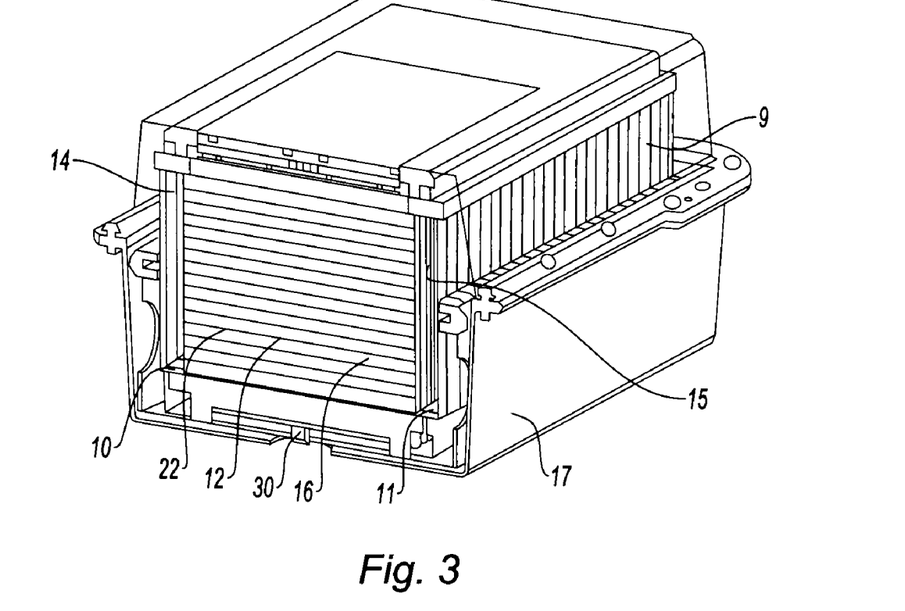
FIG. 3 is a view in transverse section of the battery in FIG. 1, also showing the body disposed in a protective vessel.
Figure 4:
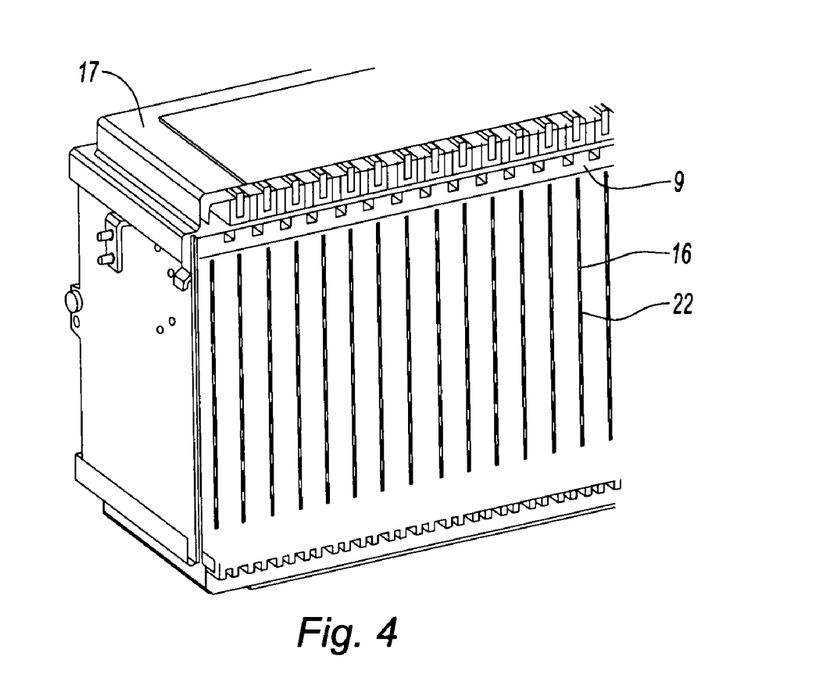
FIG. 4 is a partial view in longitudinal section of the battery in FIG. 1, also showing the body disposed in a protective vessel.

As shown in FIG. 2, the electronic packaging of the battery can be achieved in particular by providing a bus bar 26 to which the terminals 5 of a generating element 1 are welded, said bus bar being secured to the frame 19. Moreover, the electronic card 27 of the generating element 1 can be associated with the bus bar 26, in particular by providing an electronic card 27 common to several adjacent generating elements 1.

The packaging system also comprises a structural matrix 28 made from polymer resin, said matrix at least partially filling the housing 13 in order to clad the generating elements 1. Thus the generating elements 1 are held in the structural body 9 by the matrix 28, which also contributes to the mechanical strength of the whole.

In addition, the matrix 28 helps to limit the deformation of the generating elements 1 and therefore the possible increase in their internal strength. The matrix 28 also contributes to the fluidtightness of the envelope 3 and therefore to the protection of the electroactive layers 4 relative to the external environment (entry of moisture or air, leakage of electrolyte).

In addition, the matrix 28 can be thermally conductive in order also to fulfil a function of heat transfer between the generating elements 1 and the fluid circulating in the path, and/or electrically insulating for a function of electrical safety between said elements. Concerning the heat transfer, the important characteristic is the conductance, which is the ratio between the thermal conductivity of the matrix 28 and its thickness. In one example embodiment, the matrix 28 has a thermal conductivity of around 1 W/m/° C. and a thickness of around 2 mm.

As a polymer resin for the matrix 28, it is possible to use all types of polymer material having structural properties and in particular adhesives that have the advantage of increasing the rigidity of the battery and holding the generating elements 1 in said battery. The adhesives may for example be in the epoxy, silicone, polyurethane or acrylic etc family, to which inorganic components having thermal conduction properties can be added, such as $Al_2O_3$, AlN, MgO, ZnO, BeO, BN, $Si_3N_4$. SiC and/or $SiO_2$. In one example embodiment, a two-component epoxy resin of the type reference 2605 from the company 3M can be used.

For using it, after arrangement of the generating elements 1 in the housings 13, the fluid resin is disposed in said housings, said resin then being solidified in order to form the structural matrix 28. To facilitate the recyclability of the battery, a coating of primer, containing a migrating agent, can also be applied to the surface of the generating elements 1. This migrating agent must be capable of migrating over one of the connection interfaces in order to generate a low-cohesion layer. This migration is made possible by thermal activation, which also makes it possible to dismantle the bonded assemblies. This migrating agent can also be used in a primer, but also in the resin itself. The migrating agent may for example be a polyolefin, or more particularly PTSH (para-toluenesulfohydrazide), which is known to provide separation by addition of heat as described in particular by the document WO-2004/087829.

In addition, the matrix 28 can have phase change properties in a range of temperatures improving the temperature conditioning of the generating elements 1. Moreover, the matrix 28 can also have self-extinguishing properties.

In the embodiment in FIGS. 12 to 14, each module 18 includes a pair of generating elements 1 that are bonded respectively on one side of the cross-member 12 by means of a layer of adhesive 42, said elements being at least partially clad by the structural matrix 28. In addition, the elements 1 in the pair can be connected electrically in series or parallel, for example by being connected with an intermediate bus bar including a connection stud 40 screwed onto the connection.

Figure 8:
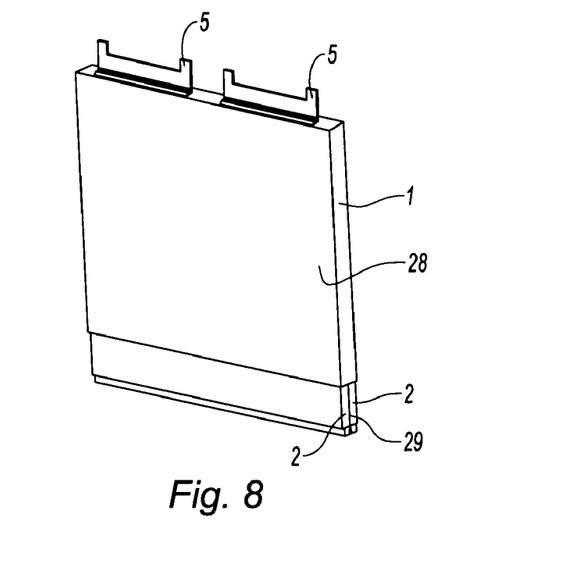
FIG. 8 is a view in perspective of the generating element according to FIG. 7, showing the arrangement of the cladding of said element by a structural matrix.
Figure 10:
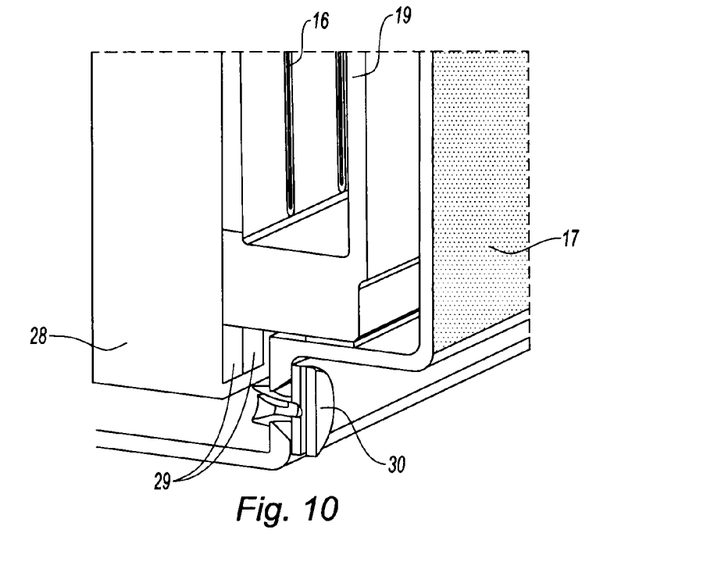
FIG. 10 is an enlarged partial view showing the rupture zone in communication with an exhaust channel.

In relation to FIG. 8, at least part of the periphery of the envelope 3 has a mechanically weakened part that forms a rupture zone 29 in the event of overpressure inside the envelope 3. Thus, in the case of thermal runaway or short-circuit, the surplus gas emitted by the generating element 1 is discharged outside said element through the local rupture, these gases then being discharged out of the battery through a discharge channel in communication with the rupture zone 29, said channel comprising a valve 30 formed on the vessel 17 (see FIG. 10).

The discharge of this overpressure prevents additional overheating that might lead to thermal runaway of the battery. In addition, this possibility of allowing the gases to escape becomes all the more important when the generating elements 1 are confined in a rigid environment that makes it possible to reduce the increases in internal resistance and thus improves their service life.

In the embodiment shown, a portion of the periphery of the envelope 3 is not clad in resin so as to form a rupture zone 29 located on a lateral edge 7 in the vicinity of the bottom 8, which is reinforced by bending. In addition, the bottom of the envelope 3 has no resin cladding. In a variant, not shown, the rupture zone can be formed mechanically, for example by scoring the envelope and/or the resin, or by a local reduction in the thickness of a cladding of resin surrounding the entire envelope 3.

Figure 9A:
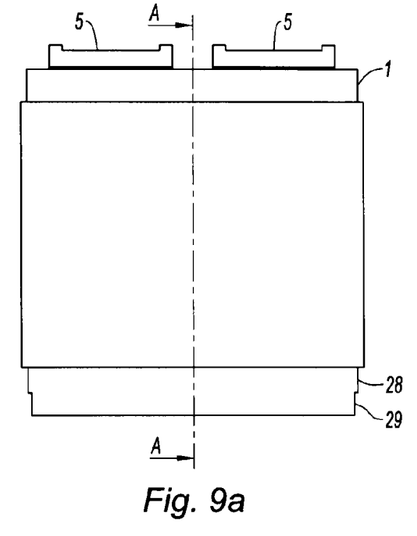
Figure 9B:
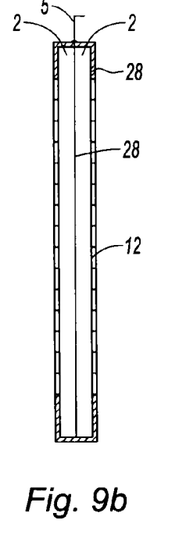
Figure 9C:
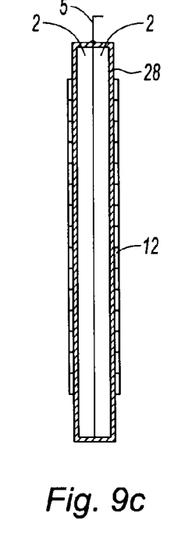

In relation to FIG. 9, the generating element 1 comprises two electrochemical cells 2 secured to each other. In FIG. 9b, the generating element 1 is bonded to the cross-members 12 and, during cladding, a matrix film 28 fixes the electrochemical cells 2 to each other. In this embodiment, a very fine thickness of adhesive is situated between the generating elements 1 and the cross-members 12. Thus, since the thermal conductivity also depends on the thickness, the heat exchanges between the elements 1 and the cross-members 12 can be assured even if the adhesive is not a very good conductor of heat.

In FIG. 9c, the electrochemical cells 2 are bonded in advance to each other and the matrix 28 fills the interstices between the generating element 1 and the cross-members 12. In this embodiment, since the matrix 28 disposed between the generating elements 1 and the cross-members 12 has a high thickness, it is preferable to use a matrix 28 having good thermal conductivity.

According to the invention, the excellent homogeneity in temperature in the battery makes it possible both to increase the level of equilibrium between the generating elements 1 and to be able to regulate the battery thermally with great precision in order to reduce as much as possible the internal resistances of the generating elements 1 without impairing their service life. The optimisation of thermal management then makes it possible to increase the energy and power of the battery, without having to add additional generating elements 1.

In addition, the conditioning system affords dissipation of the thermal energy coming from the thermal packaging of a generating element 1, without this excess heat being transferred to the adjacent generating elements 1 in a proportion that may lead to spread of the thermal runaway phenomenon. This thermal confinement role makes it possible to prevent the risks of thermal runaway propagating to the whole battery, which is very critical for high-energy batteries.

Moreover, the packaging system is capable of functioning with boiling water without risk of blockage of the channels 14, 15 or the passages 16; which has a great advantage for protection of the battery. This is because, in the event of fire or thermal runaway of a generating element 1, the water vaporisation phenomenon will make it possible to maintain the temperature of the battery at a fixed value, preventing the appearance of widespread runaway phenomena. This vaporisation temperature will depend on the nature of the fluid used, whether it be water or a fluid having a lower boiling point.

The invention claimed is:

1. An electrical battery comprising:
   a first frame defining an upstream channel;
   a second frame defining a downstream channel;
   a plurality of flat cross-members each extending between said first frame and said second frame and each in fluid communication with said upstream channel and said downstream channel substantially along an entire length of said upstream channel and said downstream channel, said plurality of cross-members being spaced apart from one another in a flow direction along said upstream channel and said downstream channel to define a plurality of housings between adjacent cross-members; and
   a plurality of electrical energy generating elements disposed within respective ones of said plurality of housings.

2. The electrical battery according to claim 1, wherein said generating elements are adhesively bonded to said cross-members.

3. The electrical battery according to claim 1, wherein said first frame includes a plurality of first frames cooperating to form said upstream channel and said second frame includes a plurality of second frames cooperating to form said downstream channel.

4. The electrical battery according to claim 3, wherein said plurality of first frames each include a first aperture formed therethrough and said plurality of second frames each include a second aperture formed therethrough.

5. The electrical battery according to claim 4, wherein said first apertures of adjacent first frames cooperate to form said upstream channel and said second apertures of adjacent second frames cooperate to form said downstream channel.

6. The electrical battery according to claim 1, wherein said first frame includes a male portion for attachment to an adjacent first frame and a female portion for attachment to another adjacent first frame and wherein said second frame includes a male portion for attachment to an adjacent second frame and a female portion for attachment to another adjacent second frame.

7. The electrical battery according to claim 1, wherein said electrical energy generating elements include a mechanically weakened part that forms a rupture zone in the event of overpressure inside said electrical energy generating elements.

8. The electrical battery according to claim 7, wherein said rupture zone is in communication with a discharge channel.

9. The electrical battery according to claim 1, further comprising a structural matrix made from polymer resin that at least partially fills said housings in order to clad said generating elements.

10. The electrical battery according to claim 1, further comprising a means for supplying fluid to said upstream channel and means for discharging fluid in said downstream channel after said fluid passes through said cross-members.

11. The electrical battery according to claim 1, wherein said cross-members each include passages extending between and in fluid communication with said upstream channel and said downstream channel, said passages being supplied in parallel by said upstream channel.

12. An electrical battery comprising:
   a structural body including a plurality of modules, an upstream channel extending along a first longitudinal axis of said structural body, a downstream channel extending along a second longitudinal axis of said structural body and substantially parallel to said first longitudinal axis, and at least one housing disposed between adjacent ones of said modules, said modules each comprising:
   a first frame having a first aperture formed therethrough, said first aperture cooperating with a first aperture of an adjacent module to form said upstream channel;
   a second frame having a second aperture formed therethrough, said second aperture cooperating with a second aperture of said adjacent module to form said downstream channel; and
   a cross-member extending between said first frame and said second frame, said cross-member cooperating with a cross-member of said adjacent module to form said at least one housing.

13. The electrical battery of claim 12, wherein said cross-member includes at least one passage.

14. The electrical battery of claim 13, wherein said at least one passage is in fluid communication with said first aperture and said second aperture.

15. The electrical battery of claim 13, further comprising a rib formed adjacent to said at least one passage and extending between said first frame and said second frame.

16. The electrical battery of claim 15, wherein said at least one passage includes at least two passages, said rib disposed between said at least two passages.

17. The electrical battery of claim 12, further comprising an electrical energy generating element disposed within said at least one housing.

18. The electrical battery of claim 17, wherein said electrical energy generating element includes an electrochemical cell.

19. The electrical battery of claim 18, wherein said electrochemical cell is packaged in a flexible, sealed envelope.

20. The electrical battery of claim 17, further comprising a structural matrix at least partially filling said at least one housing.

21. The electrical battery of claim 20, wherein said structural matrix retains said electrical generating element within said at least one housing.

22. The electrical battery of claim 20, wherein said structural matrix is thermally conductive.

23. The electrical battery of claim 20, wherein said structural matrix is a polymer resin.

24. The electrical battery of claim 12, wherein said first frame and said second frame are matingly attached to a first frame and a second frame, respectively, of an adjacent module.

25. The electrical battery of claim 12, wherein at least one of said first frame and said second frame includes a male portion and a female portion for respective attachment to a female portion and a male portion of adjacent modules.

26. The electrical battery of claim 12, wherein each of said first frame and said second frame includes a male portion and a female portion for respective attachment to a female portion and a male portion of adjacent modules.

27. An electrical battery comprising:
   a first frame defining an upstream channel;
   a second frame defining a downstream channel;
   a plurality of cross-members extending between said first frame and said second frame and each in fluid communication with said upstream channel and said downstream channel;
   a plurality of housings formed between adjacent cross-members; and
   a plurality of electrical energy generating elements disposed within respective ones of said plurality of housings, said electrical energy generating elements retained within said housings via a structural matrix.

28. The electrical battery according to claim 27, wherein said electrical energy generating elements are bonded to one of said cross-members along a first surface of said electrical energy generating elements within each of said housings.

29. The electrical battery according to claim 28, wherein said electrical energy generating elements are bonded to one of said cross-members along said first surface via an adhesive.

30. The electrical battery according to claim 29, wherein said adhesive is a thermal adhesive.

31. The electrical battery according to claim 27, wherein said structural matrix is thermally conductive.

32. The electrical battery according to claim 27, wherein said structural matrix is a polymer resin.

33. The electrical battery according to claim 27, wherein said structural matrix is formed from an electrically insulating material.

34. The electrical battery according to claim 27, further comprising a gap formed between said electrical energy generating elements and said housing, said structural matrix filling said gap.

35. The electrical battery according to claim 27, wherein said first frame includes a plurality of first frames cooperating to form said upstream channel and said second frame includes a plurality of second frames cooperating to form said downstream channel.

* * * * *